(Model.)

T. H. B. SANDERS.
EGG TESTER.

No. 258,811. Patented May 30, 1882.

Witnesses:
C. D. Boisselier
W. L. Balson

Inventor.
Thomas H B Sanders

United States Patent Office.

THOMAS H. B. SANDERS, OF ST. LOUIS, MISSOURI.

EGG-TESTER.

SPECIFICATION forming part of Letters Patent No. 258,811, dated May 30, 1882.

Application filed March 20, 1882. (Model.)

*To all whom it may concern:*

Be it known that I, THOMAS H. B. SANDERS, a citizen of the United States, and residing at St. Louis, State of Missouri, have invented a new and useful Egg-Tester, of which the following is a specification.

My invention consists in providing a box with a concave top to it with an egg-rack, a candle or lamp at or near one end, and a looking-glass at the bottom, upon which the eggs are reflected, and upon which the eggs which are bad can be detected by a person looking upon the looking-glass.

Figure 1:
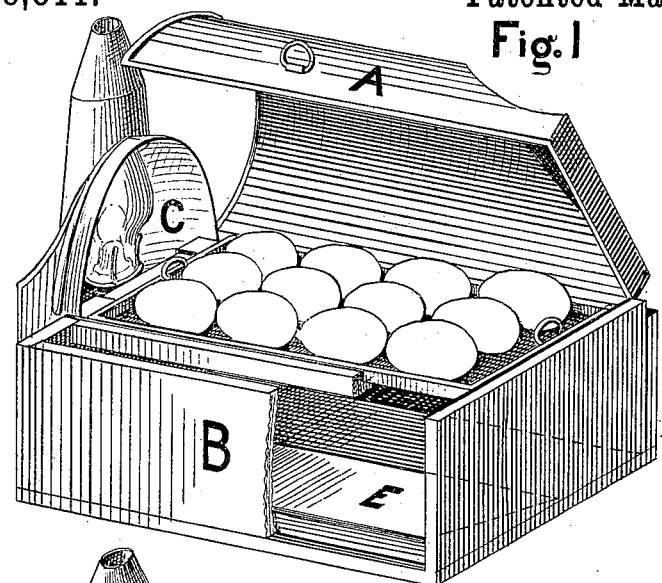
Figure 2:
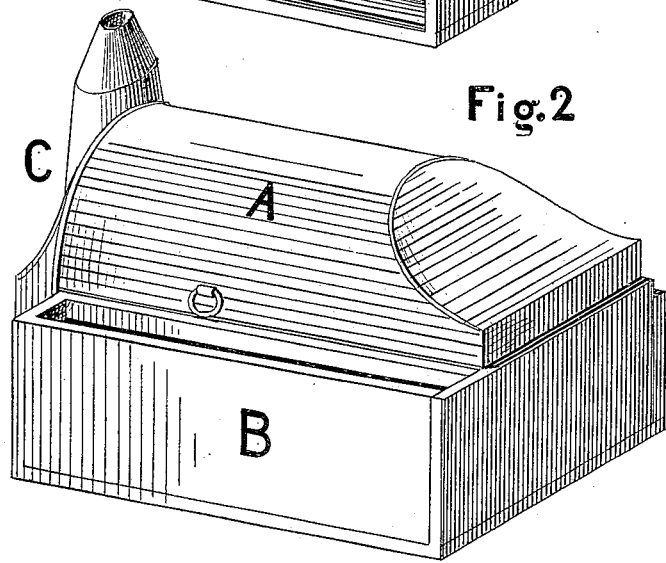
Figure 4:
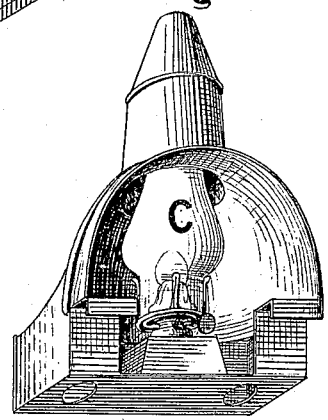
Figure 3:
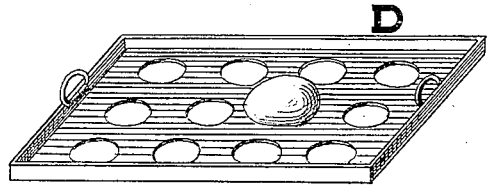

Figure 1 shows my device with the top thrown back so as to show the interior. Fig. 2 shows it closed and in use. Fig. 3 shows the egg tray or rack detached. Fig. 4 shows the lamp or candle stand detached from the box.

B is an ordinary square or oblong box, provided with a looking-glass, E, in the bottom, set at a proper inclination, so as to reflect the contents of the tray D through the oblong aperture in the front and top part of the box. B has also a tray D, made to fit in the top, and provided with holes just large enough to hold an ordinary-sized egg. At one end of this box is attached a lamp or candle house, C, made with a conical-shaped side and roof, which reflect the light from the lamp into the box at the end and under the roof or top of the box. This lamp-house C is also provided with hooks, which serve to hang it on the edge of the box, and an aperture at the top, through which the chimney passes.

A is a concave top, which serves to reflect and concentrate the light down and upon the eggs in the tray D, and through them onto the looking-glass E.

I am aware that there have been egg-candlers used before which reflect the egg on a looking-glass; but they differ from mine in that they have no box or tray or lamp-house, and not being able to concentrate the light on the egg, it is impossible to candle more than one egg at a time, while by my device a person can candle as fast as he can remove and replace another tray.

I know the tray for holding the eggs, the glass for reflecting them in the box, and the box to hold the glass and tray are old, and that their combination is old in egg-testers, being shown in Burt's patent on "egg-testers," dated 1858, and No. 22,161, and also in patent to Summers and Nye, dated March 19, 1867, and No. 62,979, wherein the chamber is provided with an "eye-hole" and an adjustable screen to hold the egg and a reflector, all constructed and combined specifically to operate as described in said patent. Therefore I do not claim them separately nor in any of the above combinations indicated. The detachable lamp is also old, as it is shown in English Patent No. 464, dated 1868; but these all differ from mine in that none of them are provided with reflectors to reflect the light and concentrate it upon the eggs in the tray, which my egg-tester does accomplish by means of the reflector in the lamp-house and the reflector at the top of the box. The light of the lamp is thrown into the top of the box from the lamp-house, and collected by the concave top and concentrated upon the eggs in the tray, thus enabling the operator to detect the slightest defect in the eggs in the tray by aid of the concentrated light. I therefore claim nothing as new except the specific combination of parts as described, as the parts are old in themselves.

What I claim as new, then, is—

An egg-tester consisting of a tight box having an egg-tray and looking-glass, and a concave lid at the top, and provided with a lamp at one end, incased in a lamp-house, all specifically constructed, combined, and arranged as herein described, and for the purposes set forth.

THOMAS H. B. SANDERS.

Witnesses:
 WM. M. ECCLES,
 A. A. PAXSON.